United States Patent
Rune et al.

(10) Patent No.: US 10,390,291 B2
(45) Date of Patent: Aug. 20, 2019

(54) RISK AWARE VALIDITY ASSESSMENT OF SYSTEM INFORMATION

(71) Applicant: TELEFONAKTIEBOLAGET LM ERICSSON (PUBL), Stockholm (SE)

(72) Inventors: Johan Rune, Lidingö (SE); Icaro L. J. Da Silva, Solna (SE); Gunnar Mildh, Sollentuna (SE); Jose Luis Pradas, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 71 days.

(21) Appl. No.: 15/523,755

(22) PCT Filed: Aug. 17, 2016

(86) PCT No.: PCT/SE2016/050768
§ 371 (c)(1),
(2) Date: May 2, 2017

(87) PCT Pub. No.: WO2018/034603
PCT Pub. Date: Feb. 22, 2018

(65) Prior Publication Data
US 2018/0310228 A1    Oct. 25, 2018

(51) Int. Cl.
*H04W 48/02* (2009.01)
*H04W 48/10* (2009.01)
*H04W 48/14* (2009.01)
*H04W 48/18* (2009.01)
*H04W 56/00* (2009.01)

(52) U.S. Cl.
CPC .......... *H04W 48/10* (2013.01); *H04W 48/02* (2013.01); *H04W 48/14* (2013.01); *H04W 48/18* (2013.01); *H04W 56/001* (2013.01)

(58) Field of Classification Search
CPC ..... H04W 48/00; H04W 48/02; H04W 48/06; H04W 48/10; H04W 48/12; H04W 48/14; H04W 48/16; H04W 48/18; H04W 56/001
See application file for complete search history.

(56) References Cited

U.S. PATENT DOCUMENTS 7,957,739 B2 * 6/2011 Jeong ............... H04W 48/16
                                                    455/435.1
8,014,351 B2 * 9/2011 Ko .................... H04W 48/12
                                                    370/329
(Continued)

FOREIGN PATENT DOCUMENTS

AU     2016218355 A1 *  7/2017  ............ H04W 48/14
CA        2669679 A1 *  5/2008  ............ H04W 48/12
(Continued)

OTHER PUBLICATIONS

International Search Report and Written Opinion issued in Application No. PCT/SE2016/050768 dated May 16, 2017, 17 pages.
(Continued)

*Primary Examiner* — Eric Nowlin
(74) *Attorney, Agent, or Firm* — Sage Patent Group

(57) ABSTRACT

A radio device (10) acquires system information from the wireless communication network. The system information comprises parameters for controlling access of the radio device (10) to the wireless communication network. The system information is organized in at least two classes differing with respect to a risk level associated with accessing the wireless communication network based on one or more parameters of the class. Further, the radio device (10) receives validation information which enables the radio device (10) to determine, individually for at least one of the classes, validity of the system information as previously acquired by the radio device (10). Depending on the validity and the risk level associated with at least one of the classes, the radio device (10) determines whether to access the wireless communication network based on the system information as previously acquired by the radio device (10).

25 Claims, 13 Drawing Sheets

(56) References Cited

U.S. PATENT DOCUMENTS

| | | | | |
|---|---|---|---|---|
| 8,042,033 | B2* | 10/2011 | Karmanenko | H04W 12/10 714/807 |
| 8,270,388 | B2* | 9/2012 | Chmiel | H04W 48/12 370/315 |
| 8,457,618 | B2* | 6/2013 | Narasimha | H04W 48/16 455/414.1 |
| 8,792,338 | B2* | 7/2014 | Lee | H04W 4/021 370/229 |
| 8,886,114 | B2* | 11/2014 | Mildh | H04B 7/155 455/11.1 |
| 9,544,105 | B2* | 1/2017 | Siomina | H04J 11/005 |
| 9,661,525 | B2* | 5/2017 | Rajadurai | H04W 28/0205 |
| 9,693,173 | B2* | 6/2017 | Vannithamby | H04W 48/12 |
| 9,699,765 | B2* | 7/2017 | Sagfors | H04W 72/02 |
| 9,736,864 | B2* | 8/2017 | Wu | H04W 74/0833 |
| 9,756,558 | B2* | 9/2017 | Sfar | H04W 76/19 |
| 9,992,736 | B2* | 6/2018 | da Silva | H04W 48/16 |
| 10,003,996 | B2* | 6/2018 | Rajadurai | H04W 28/0205 |
| 10,028,254 | B2* | 7/2018 | Kota | H04W 72/02 |
| 10,045,281 | B2* | 8/2018 | Du | H04W 48/10 |
| 10,098,055 | B2* | 10/2018 | Frenger | H04W 48/12 |
| 10,111,194 | B2* | 10/2018 | Reial | H04W 48/12 |
| 10,142,916 | B2* | 11/2018 | da Silva | H04W 48/16 |
| 10,182,390 | B2* | 1/2019 | Yan | H04W 76/10 |
| 2006/0166694 | A1* | 7/2006 | Jeong | H04W 48/16 455/525 |
| 2008/0125043 | A1* | 5/2008 | Karmanenko | H04W 12/10 455/41.2 |
| 2008/0212522 | A1* | 9/2008 | Ko | H04W 48/12 370/328 |
| 2009/0318128 | A1* | 12/2009 | Narasimha | H04W 48/16 455/422.1 |
| 2010/0272015 | A1* | 10/2010 | Chmiel | H04W 48/12 370/328 |
| 2011/0092186 | A1* | 4/2011 | Krco | H04W 4/20 455/411 |
| 2012/0250501 | A1* | 10/2012 | Lee | H04W 4/021 370/229 |
| 2012/0276933 | A1* | 11/2012 | Laitinen | H04W 68/025 455/458 |
| 2013/0258938 | A1* | 10/2013 | Sagfors | H04W 72/02 370/312 |
| 2014/0029594 | A1* | 1/2014 | Lee | H04W 72/0446 370/336 |
| 2015/0237545 | A1* | 8/2015 | Takano | H04W 48/10 370/331 |
| 2015/0256995 | A1* | 9/2015 | Rune | H04W 8/186 455/418 |
| 2015/0282157 | A1* | 10/2015 | Kim | H04W 48/14 370/329 |
| 2015/0296444 | A1* | 10/2015 | Sfar | H04W 76/19 455/434 |
| 2016/0073326 | A1* | 3/2016 | Vannithamby | H04W 48/12 370/312 |
| 2016/0174135 | A1* | 6/2016 | Yan | H04W 76/10 455/434 |
| 2016/0234735 | A1* | 8/2016 | Kubota | H04W 48/14 |
| 2016/0262088 | A1* | 9/2016 | Frenger | H04W 74/0833 |
| 2016/0315752 | A1* | 10/2016 | Chen | H04L 5/005 |
| 2016/0338113 | A1* | 11/2016 | Wu | H04W 74/0833 |
| 2017/0048920 | A1* | 2/2017 | Kim | H04W 4/70 |
| 2017/0257791 | A1* | 9/2017 | Rajadurai | H04W 28/0205 |
| 2017/0265165 | A1* | 9/2017 | Li | H04W 48/14 |
| 2017/0311233 | A1* | 10/2017 | Du | H04W 48/10 |
| 2017/0331577 | A1* | 11/2017 | Parkvall | H04J 11/0079 |
| 2017/0331670 | A1* | 11/2017 | Parkvall | H04W 52/0274 |
| 2017/0353915 | A1* | 12/2017 | da Silva | H04W 48/16 |
| 2018/0014175 | A1* | 1/2018 | Desai | H04W 48/16 |
| 2018/0014274 | A1* | 1/2018 | Tu | H04J 11/0023 |
| 2018/0020394 | A1* | 1/2018 | da Silva | H04W 48/12 |
| 2018/0035468 | A1* | 2/2018 | Ishii | H04W 72/0446 |
| 2018/0063815 | A1* | 3/2018 | Ishii | H04W 64/00 |
| 2018/0077632 | A1* | 3/2018 | Frenger | H04W 48/06 |
| 2018/0098269 | A1* | 4/2018 | Pradas | H04L 41/0813 |
| 2018/0098295 | A1* | 4/2018 | Reial | H04W 48/12 |
| 2018/0124689 | A1* | 5/2018 | Frenger | H04L 25/03866 |
| 2018/0139625 | A1* | 5/2018 | Breuer | H04W 74/006 |
| 2018/0139687 | A1* | 5/2018 | Breuer | H04W 74/006 |
| 2018/0146404 | A1* | 5/2018 | Zhang | H04W 48/12 |
| 2018/0146416 | A1* | 5/2018 | Breuer | H04W 74/006 |
| 2018/0167911 | A1* | 6/2018 | Kota | H04W 72/02 |
| 2018/0227832 | A1* | 8/2018 | Da Silva | H04W 48/08 |
| 2018/0255503 | A1* | 9/2018 | Karlsson | H04W 48/10 |
| 2018/0270738 | A1* | 9/2018 | Martinez Tarradell | H04W 4/70 |
| 2018/0279203 | A1* | 9/2018 | da Silva | H04W 48/16 |
| 2018/0288679 | A1* | 10/2018 | Hessler | H04W 48/12 |
| 2018/0332584 | A1* | 11/2018 | Jung | H04W 48/08 |
| 2018/0359682 | A1* | 12/2018 | Nader | H04L 12/189 |
| 2018/0376407 | A1* | 12/2018 | Myhre | H04W 76/27 |
| 2019/0007892 | A1* | 1/2019 | Sheik | H04L 5/0096 |
| 2019/0053156 | A1* | 2/2019 | Vos | H04W 52/0216 |
| 2019/0090177 | A1* | 3/2019 | Yan | H04W 76/10 |
| 2019/0110179 | A1* | 4/2019 | Lee | H04W 4/90 |

FOREIGN PATENT DOCUMENTS

| | | | | |
|---|---|---|---|---|
| CA | 2669679 | C * | 6/2013 | H04W 48/12 |
| CA | 2980816 | A1 * | 10/2016 | H04W 74/006 |
| CN | 101542915 | A * | 9/2009 | H04W 48/12 |
| CN | 101542915 | B * | 10/2013 | H04W 48/12 |
| CN | 107211353 | A * | 9/2017 | H04W 48/14 |
| CN | 107455011 | A * | 12/2017 | H04W 74/006 |
| CN | 107925946 | A * | 4/2018 | H04W 4/70 |
| EP | 2087599 | A1 * | 8/2009 | H04W 48/12 |
| EP | 2087599 | A4 * | 8/2013 | H04W 48/12 |
| EP | 2087599 | B1 * | 10/2014 | H04W 48/12 |
| EP | 2844004 | A1 * | 3/2015 | H04W 48/12 |
| EP | 2903349 | A1 * | 8/2015 | H04W 74/006 |
| EP | 2903349 | B1 * | 4/2017 | H04W 74/006 |
| EP | 3257299 | A1 * | 12/2017 | H04W 48/14 |
| EP | 3202185 | B1 * | 1/2018 | H04W 48/12 |
| EP | 3267732 | A1 * | 1/2018 | H04J 11/0023 |
| EP | 3335475 | A1 * | 6/2018 | H04W 4/70 |
| EP | 3335475 | A4 * | 6/2018 | H04W 4/70 |
| KR | 100933399 | B1 * | 12/2009 | H04W 48/12 |
| KR | 20150068378 | A * | 6/2015 | H04W 48/14 |
| KR | 101648777 | B1 * | 8/2016 | H04W 48/14 |
| KR | 20170117048 | A * | 10/2017 | H04W 48/14 |
| RU | 2009119175 | A * | 11/2010 | H04W 48/12 |
| RU | 2413362 | C2 * | 2/2011 | H04W 48/12 |
| WO | WO-2008062971 | A1 * | 5/2008 | H04W 48/12 |
| WO | WO-2013183966 | A1 * | 12/2013 | H04W 76/14 |
| WO | WO-2014029668 | A1 * | 2/2014 | H04W 48/16 |
| WO | WO-2014054910 | A1 * | 4/2014 | H04W 48/14 |
| WO | WO-2016053155 | A1 * | 4/2016 | H04W 48/12 |
| WO | WO-2016130355 | A1 * | 8/2016 | H04W 48/14 |
| WO | WO-2016162329 | A1 * | 10/2016 | H04W 74/006 |
| WO | WO-2017026845 | A1 * | 2/2017 | H04W 4/70 |
| WO | 2017036552 | A1 | 3/2017 | |
| WO | 2017036564 | A1 | 3/2017 | |

OTHER PUBLICATIONS

3GPP: "5G—Key Component of the Networked Society", 3GPP RAN Workshop on 5G; Phoenix, AZ, USA, Sep. 17-18, 2015; RWS-150009; 55 pages.

Säily, M. et al.: "Mobile and wireless communications Enablers for the Twenty-twenty Information Society-II Deliverable D6.1 Draft Asynchronous Control Functions and Overall Control Plane Design", Version v1.0, Jun. 30, 2016, XP055322758, 120 pages.

Frenger, P. et al.: "A Clean Slate Radio Network Designed for Maximum Energy Performance", 2014 IEEE 25th International Symposium on Personal, Indoor and Mobile Radio Communication, XP-002764578, pp. 1300-1304.

* cited by examiner

| Access Information Table (AIT) | | | |
|---|---|---|---|
| Common part (ingress) | | | |
| Risk level class 2 = {Parameter type X} | | | |
| Risk level class 1 = {Parameter types Y, Z} | | | |
| Risk level class 0 = {All other parameter types} | | | |
| System information configurations and associated SSIs | | | |
| SSI | System information parameters | | |
| SSI = 1 | X = 0 | Y = 2 | Z = 1 | Q = 3 |
| SSI = 2 | X = 1 | Y = 2 | Z = 2 | Q = 3 |
| SSI = 3 | X = 3 | Y = 1 | Z = 0 | Q = 5 |
| SSI = 4 | X = 1 | Y = 3 | Z = 1 | Q = 2 |
| SSI = 5 | X = 2 | Y = 1 | Z = 3 | Q = 4 |
| ⋮ | ⋮ | ⋮ | ⋮ | ⋮ |

FIG. 3A

| Access Information Table (AIT) | | | | |
|---|---|---|---|---|
| Common part (ingress) | | | | |
| (Possible ingress data....) | | | | |
| System information configurations and associated SSIs | | | | |
| SSI | System information parameters | | | |
| SSI = 1 | X = 0<br>RLC = 1 | Y = 2<br>RLC = 1 | Z = 1<br>RLC = 0 | Q = 3<br>RLC = 1 | ... |
| SSI = 2 | X = 1<br>RLC = 2 | Y = 2<br>RLC = 1 | Z = 2<br>RLC = 0 | Q = 3<br>RLC = 1 | ... |
| SSI = 3 | X = 3<br>RLC = 2 | Y = 1<br>RLC = 1 | Z = 0<br>RLC = 0 | Q = 5<br>RLC = 0 | ... |
| SSI = 4 | X = 1<br>RLC = 2 | Y = 3<br>RLC = 0 | Z = 1<br>RLC = 0 | Q = 2<br>RLC = 1 | ... |
| SSI = 5 | X = 2<br>RLC = 2 | Y = 1<br>RLC = 1 | Z = 3<br>RLC = 1 | Q = 4<br>RLC = 1 | ... |

FIG. 3B

| SSI | Access Information Table (AIT) | | | |
|---|---|---|---|---|
| | Common part (ingress) | | | |
| | System information configurations and associated SSIs | | | |
| | System information parameters | | | |
| SSI = 1 | X = 0 | Y = 2 | Z = 1 | Q = 3 | ... |
| SSI = 2 | X = 1 | Y = 2 | Z = 2 | Q = 3 | ... |

FIG. 3C

| Access Information Table (AIT) | | |
|---|---|---|
| Common part (ingress) | | |
| (Possible ingress data…) | | |
| System information configuration parameters | | |
| Parameter sets of type A each with an associated sub-SSIa [Risk level class = α] | | |
| Sub-SSIa | Set A parameters | |
| Sub-SSIa = 1 | X = 0 | Y = 2 |
| Sub-SSIa = 2 | X = 1 | Y = 2 |
| Sub-SSIa = 3 | X = 3 | Y = 1 |
| Parameter sets of type B each with an associated sub-SSIb [Risk level class = β] | | |
| Sub-SSIb | Set B parameters | |
| Sub-SSIb = 1 | Z = 1 | Q = 2 |
| Sub-SSIb = 2 | Z = 2 | Q = 4 |
| Parameter sets of type C each with an associated sub-SSIc [Risk level class = γ] | | |
| Sub-SSIc | Set C parameters | |
| Sub-SSIc = 1 | P = 0 | |

FIG. 3D

RISK AWARE VALIDITY ASSESSMENT OF SYSTEM INFORMATION

CROSS REFERENCE TO RELATED APPLICATION(S)

This application is a 35 U.S.C. § 371 National Stage of International Patent Application No. PCT/SE2016/050768, filed Aug. 17, 2016, designating the United States, the disclosure of which is incorporated by reference.

TECHNICAL FIELD

The present invention relates to methods for controlling access to a wireless communication network and to corresponding devices.

BACKGROUND

When in a wireless communication network based on the LTE (Long Term Evolution) radio access technology (RAT) specified by 3GPP (3$^{rd}$ Generation Partnership Project) a UE (user equipment) initially accesses the wireless communication network, the UE needs to acquire what is called system information (SI). This is typically accomplished via broadcast of a certain information in each cell. The broadcasted information includes a primary synchronization signal (PSS) and a secondary synchronization signal (SSS), which may be used by the UE to obtain frequency and time synchronization. The PSS and SSS also encode the physical cell identity (PCI). After the physical layer synchronization and PCI detection, the UE is capable of performing channel estimation using the constantly broadcasted cell specific reference signals (C-RSs) and, consequently, finally decode the SI. The PSS and SSS are respectively transmitted in the first and sixth subframes within a radio frame. Accordingly, the PSS/SSS and C-RSs are always broadcasted by the network. These are used by the UE to synchronize to a given cell and enabling channel estimation.

The SI is broadcasted in each cell by System Information Blocks (SIBs), each of which contains a set of functionally related parameters. The SIB types that have been defined include, a Master Information Block (MIB), which includes a limited number of the most frequently transmitted parameters which are essential for the UE's initial access to the network, a System Information Block Type 1 (SIB1), which contains parameters needed to determine if a cell is suitable for cell selection, as well as information about time-domain scheduling of the other SIBs, a System Information Block Type 2 (SIB2), which includes common and shared channel information, System Information Blocks of Type 3 to 8 (SIB3-SIB8), which include parameters used to control intra-frequency, inter-frequency and inter-RAT cell reselection, System Information Block Type 9, which is used to signal the name of a Home eNodeB (HeNB), System Information Blocks of Type 3 to 8 (SIB3-SIB8), which includes Earthquake and Tsunami Warning Service (ETWS) notifications and Commercial Mobile Alert System (CMAS) warning messages, System Information Block Type 13 (SIB13), which includes MBMS (Multimedia Broadcast Multicast Service) related control information, System Information Block Type 14 (SIB14), which is used to configure Extended Access Barring (EAB), System Information Block Type 15 (SIB15), which is used to convey MBMS mobility related information, and System Information Block Type 16 (SIB16), which is used to convey GPS (Global Positioning System) related information. This list of SIB types has been expanding over the years, and this expansion may be expected to continue as the 3GPP LTE RAT evolves.

Some of the SI is defined as being "essential information", e.g., the information contained in the MIB, SIB1, and SIB2. For UEs which are EAB capable, the information in SIB14 is also considered as "essential information". Here, "essential information" is considered to be information that the UE should acquire before accessing the wireless communication network.

In the LTE RAT, the SI, i.e., the MIB and the SIBs, is constantly broadcasted, but depending on the type of information, different periodicities are used. For example, the MIB and SIB1 may be broadcasted with periodicities of 40 ms and 80 ms. Furthermore, for the MIB the transmission is repeated four times during each broadcast period, i.e., every 10 ms. The SIB1 is also repeated four times within each broadcast period, i.e. every 20 ms, but with a different redundancy version for each transmission. For other SIB types, the time-domain scheduling may be dynamically adapted. In particular, each SIB may be is transmitted in a periodically-occurring time-domain window, while physical layer control signaling indicates in which subframes within this window the SI is actually transmitted. The scheduling windows of the different SIBs, referred to as SI-windows, are consecutive, i.e., without overlaps or gaps between them, and have a common length that is configurable. The SI-windows can include subframes in which it is not possible to transmit SIBs, such as subframes used for the SIB1, and subframes used for the uplink in TDD (Time Division Duplex Mode).

As can be seen, the way of transmitting the SI in the LTE RAT may result in a significant amount of signals which are constantly broadcasted.

To increase efficiency of fifth generation (5G) wireless communication networks, a concept was suggested which is based on a layered transmission of access information (see, e.g., "A Clean Slate Radio Network Designed for Maximum Energy Performance" by P. Frenger et al., presented on the IEEE 25$^{th}$ Annual International Symposium on Personal, Indoor, and Mobile Radio Communications (PIMRC), Washington, D.C., Sep. 2-5, 2014). In this concept, user equipments (UEs) are provided with access information by using broadcasted access information tables (AITs) and broadcasted system signature sequences (SSSs), wherein each SSS may be used to identify information from the broadcasted AIT. The AIT may for example define settings concerning a how a UE shall access the system, e.g., by a random access procedure, concerning how the UE can be reached by the system in a paging procedure, or concerning more advanced settings, such as related to beam forming or link adaptation. The AITs are typically transmitted with long periodicity, while the SSSs are typically transmitted more frequently. Typically each access node, e.g., a base station, will transmit an SSS which allows the UE to identify the information applicable to this access node from the AIT. The AITs do not need to be transmitted by every access node. For example, a base stations serving a macro cell may transmit both an AIT and an SSS, while a base station serving a small cell within a coverage region of the macro cell may transmit only an SSS. Accordingly, the AIT will typically include entries defining various configurations which apply to various access nodes. The AIT may therefore have considerable size, so that in view of resource efficiency it is generally desirable to broadcast the AIT at a relatively low update rate.

However, when broadcasting the AIT at a low update rate, situations may occur where the AIT last received by the UE is no longer valid, e.g., because a certain configuration as identified by the SSS received by the UE has been changed by the network, but the updated AIT was not yet broadcasted to the UE or because the UE has moved to another area where another AIT is valid, but this other AIT was not yet received by the UE. In some situations, it is also possible that the last SSS received by the UE does not point to the correct configuration in the AIT, i.e., that the SSS or the mapping of SSSs to entries of the AIT is no longer valid. Before the UE can access the wireless communication network, it may thus need to wait until it has received a valid AIT and a valid SSS.

In order to avoid latency resulting from a need to wait for receiving a valid AIT or SSS, the UE may also use the previously received AIT and/or SSS even though in may be no longer valid. However, this involves a risk of the UE attempting to access the wireless communication network on the basis of an inappropriate configuration, which may cause various problems, such as failure of the access attempt or network-side misconfigurations which impact operation of the wireless communication network also with respect to other UEs. In other situations, using the configuration determined from the outdated AIT or SSS may be possible without a significant risk of such problems.

In the LTE RAT, the SI normally changes only at specific radio frames whose System Frame Number (SFN) is given by SFN mod N=0, where N is configurable and defines the period between two radio frames at which a change may occur, also known as modification period. Before a change of the SI, the UE may be notified by means of a Paging message including a SystemInfoModification flag. Further, a change of the SI may be indicated by a value tag in SIB1 which is incremented every time one or more SI message changes.

If the UE receives a notification of a change of SI, it starts acquiring SI from the start of the next modification period. Until the UE has successfully acquired the updated SI, it continues to use the existing parameters. This may be acceptable if changes of the SI are much less frequent than transmission of the SI. However, if the SI is transmitted less frequently, such as in the above-mentioned case of using the AIT for resource efficient transmission of SI, or if changes of the SI occur more frequently, accessing the wireless communication network based on invalid SI may be problematic from the perspective of the individual UE and also from the network perspective. For example, an excessive number of failed access attempts may adversely affect user experience and cause additional signaling which consumes network resources.

Accordingly, there is a need for techniques which allow for efficiently controlling access to a cellular network on the basis of invalid SI.

SUMMARY

According to an embodiment of the invention, a method of controlling access to a cellular network is provided. According to the method, a radio device acquires system information from the wireless communication network. The system information comprises parameters for controlling access of the radio device to the wireless communication network. The system information is organized in at least two classes differing with respect to a risk level associated with accessing the wireless communication network based on one or more parameters of the class. Further, the radio device receives validation information which enables the radio device to determine, individually for at least one of the classes, validity of the system information as previously acquired by the radio device. Depending on the validity and the risk level associated with at least one of the classes, the radio device determines whether to access the wireless communication network based on the system information as previously acquired by the radio device.

According to a further embodiment of the invention, a method of controlling access to a cellular network is provided. According to the method, an access node of the wireless communication network transmits system information to at least one radio device in a coverage area of the access node. The system information comprises parameters for controlling access of the at least one radio device to the wireless communication network. The system information is organized in at least two classes differing with respect to a risk level associated with accessing the wireless communication network based on one or more parameters of the class. Further, the access node transmits validation information which enables the at least one radio device to determine, individually for at least one of the classes, validity of the system information as previously received by the radio device.

According to a further embodiment of the invention, a radio device for a wireless communication network is provided. The radio device is configured to acquire system information from the wireless communication network. The system information comprises parameters for controlling access of the radio device to the wireless communication network. The system information is organized in at least two classes differing with respect to a risk level associated with accessing the wireless communication network based on one or more parameters of the class. Further, the radio device is configured to receive validation information which enables the radio device to determine, individually for at least one of the classes, validity of the system information as previously acquired by the radio device. Further, the radio device is configured to determine, depending on the validity and the risk level associated with at least one of the classes, whether to access the wireless communication network based on the system information as previously acquired by the radio device.

According to a further embodiment of the invention, a radio device for a wireless communication network is provided. The radio device comprises at least one processor and a memory. The memory contains program code executable by the at least one processor, whereby the radio device is configured to:

acquire system information from the wireless communication network, the system information comprising parameters for controlling access of the radio device to the wireless communication network and being organized in at least two classes differing with respect to a risk level associated with accessing the wireless communication network based on one or more parameters of the class;

receive validation information which enables the radio device to determine, individually for at least one of the classes, validity of the system information as previously acquired by the radio device; and depending on the validity and the risk level associated with at least one of the classes, determine whether to access the wireless communication network based on the system information as previously acquired by the radio device.

According to a further embodiment of the invention, a radio device for a wireless communication network is provided. The radio device comprises a module configured to acquire system information from the wireless communication network. The system information comprises parameters for controlling access of the radio device to the wireless communication network. The system information is organized in at least two classes differing with respect to a risk level associated with accessing the wireless communication network based on one or more parameters of the class. Further, the radio device comprises a module configured to receive validation information which enables the radio device to determine, individually for at least one of the classes, validity of the system information as previously acquired by the radio device. Further, the radio device comprises a module configured to determine, depending on the validity and the risk level associated with at least one of the classes, whether to access the wireless communication network based on the system information as previously acquired by the radio device.

According to a further embodiment of the invention, an access node for a wireless communication network is provided. The access node is configured to transmit system information to at least one radio device in a coverage area of the access node. The system information comprises parameters for controlling access of the at least one radio device to the wireless communication network. The system information is organized in at least two classes differing with respect to a risk level associated with accessing the wireless communication network based on one or more parameters of the class. Further, the access node is configured to transmit validation information which enables the at least one radio device to determine, individually for at least one of the classes, validity of the system information as previously acquired by the radio device.

According to a further embodiment of the invention, an access node for a wireless communication network is provided. The access node comprises at least one processor and a memory. The memory contains program code executable by the at least one processor whereby the access node is configured to:

transmit system information to at least one radio device in a coverage area of the access node, the system information comprising parameters for controlling access of the at least one radio device to the wireless communication network and being organized in at least two classes differing with respect to a risk level associated with accessing the wireless communication network based on one or more parameters of the class; and transmit validation information which enables the at least one radio device to determine, individually for at least one of the classes, validity of the system information as previously acquired by the radio device.

According to a further embodiment of the invention, an access node for a wireless communication network is provided. The access node comprises a module configured to transmit system information to at least one radio device in a coverage area of the access node. The system information comprises parameters for controlling access of the at least one radio device to the wireless communication network. The system information is organized in at least two classes differing with respect to a risk level associated with accessing the wireless communication network based on one or more parameters of the class. Further, the access node comprises a module configured to transmit validation information which enables the at least one radio device to determine, individually for at least one of the classes, validity of the system information as previously acquired by the radio device.

According to a further embodiment of the invention, a computer program or computer program product is provided, e.g., in the form of a non-transitory storage medium, which comprises program code to be executed by at least one processor of an radio device for a wireless communication network. Execution of the program code causes the radio device to acquire system information from the wireless communication network. The system information comprises parameters for controlling access of the radio device to the wireless communication network. The system information is organized in at least two classes differing with respect to a risk level associated with accessing the wireless communication network based on one or more parameters of the class. Further, execution of the program code causes the radio device to receive validation information which enables the radio device to determine, individually for at least one of the classes, validity of the system information as previously acquired by the radio device. Further, execution of the program code causes the radio device to determine, depending on the validity and the risk level associated with at least one of the classes, whether to access the wireless communication network based on the system information as previously acquired by the radio device.

According to a further embodiment of the invention, a computer program or computer program product is provided, e.g., in the form of a non-transitory storage medium, which comprises program code to be executed by at least one processor of an access node for a wireless communication network. Execution of the program code causes the access node to transmit system information to at least one radio device in a coverage area of the access node. The system information comprises parameters for controlling access of the at least one radio device to the wireless communication network. The system information is organized in at least two classes differing with respect to a risk level associated with accessing the wireless communication network based on one or more parameters of the class. Further, execution of the program code causes the access node to transmit validation information which enables the at least one radio device to determine, individually for at least one of the classes, validity of the system information as previously acquired by the radio device.

Details of such embodiments and further embodiments will be apparent from the following detailed description of embodiments.

BRIEF DESCRIPTION OF THE DRAWINGS

FIGS. 3A to 3D show examples of risk level based organization of an AIT according to an embodiment of the invention.

DETAILED DESCRIPTION OF EMBODIMENTS

In the following, concepts in accordance with exemplary embodiments of the invention will be explained in more detail and with reference to the accompanying drawings. The illustrated embodiments relate to control of access to a wireless communication network by radio devices, in the following also referred to as UEs. The wireless communication network may for example be based on a 5G radio access technology, such as an evolution of the LTE RAT. However, it is to be understood that the illustrated concepts could also be applied to other RATs, e.g., to the LTE RAT.

In examples as further illustrated below, it is assumed that information which is utilized by the UEs for accessing the wireless communication network is provided in a layered manner to the UEs. Specifically, AITs are transmitted by some access nodes of the cellular network to the UEs.

The AITs include entries which are each identified by an identifier, and each of such entries includes one or more parameters of a configuration which may be selected by the UE to be applied when accessing the wireless communication network, in particular in a certain coverage area, e.g. cell, of the wireless communication network. The identifier may correspond to a system signature sequence as transmitted by an access node of the cellular network. The access nodes each transmit such identifier, and the UEs may utilize this transmitted identifier to identify an entry of the AIT which is applicable for the specific access node or for a coverage area controlled by this access node. The entry of the AIT may defined a configuration, or set of parameters, to be applied for a given coverage area and/or access node.

The system signature sequence may encode an index which differs between different access nodes. In the following, the identifier is thus also referred to as SSI (System Signature Index). The AITs do not need to be transmitted by every access node. That is to say, there may be access nodes which transmit the identifier, but no AIT. The UEs may then utilize the transmitted identifier to identify an AIT entry of an AIT transmitted by another access node. Further, the AITs may be transmitted less frequently than the identifiers. Accordingly, changes in the way of utilizing a certain access node for accessing the wireless communication network may be indicated by modifying the identifier transmitted by this access node. Having received the AIT, the UE will store the AIT and may then utilized the system information from this stored AIT until the AIT is updated.

Figure 1:
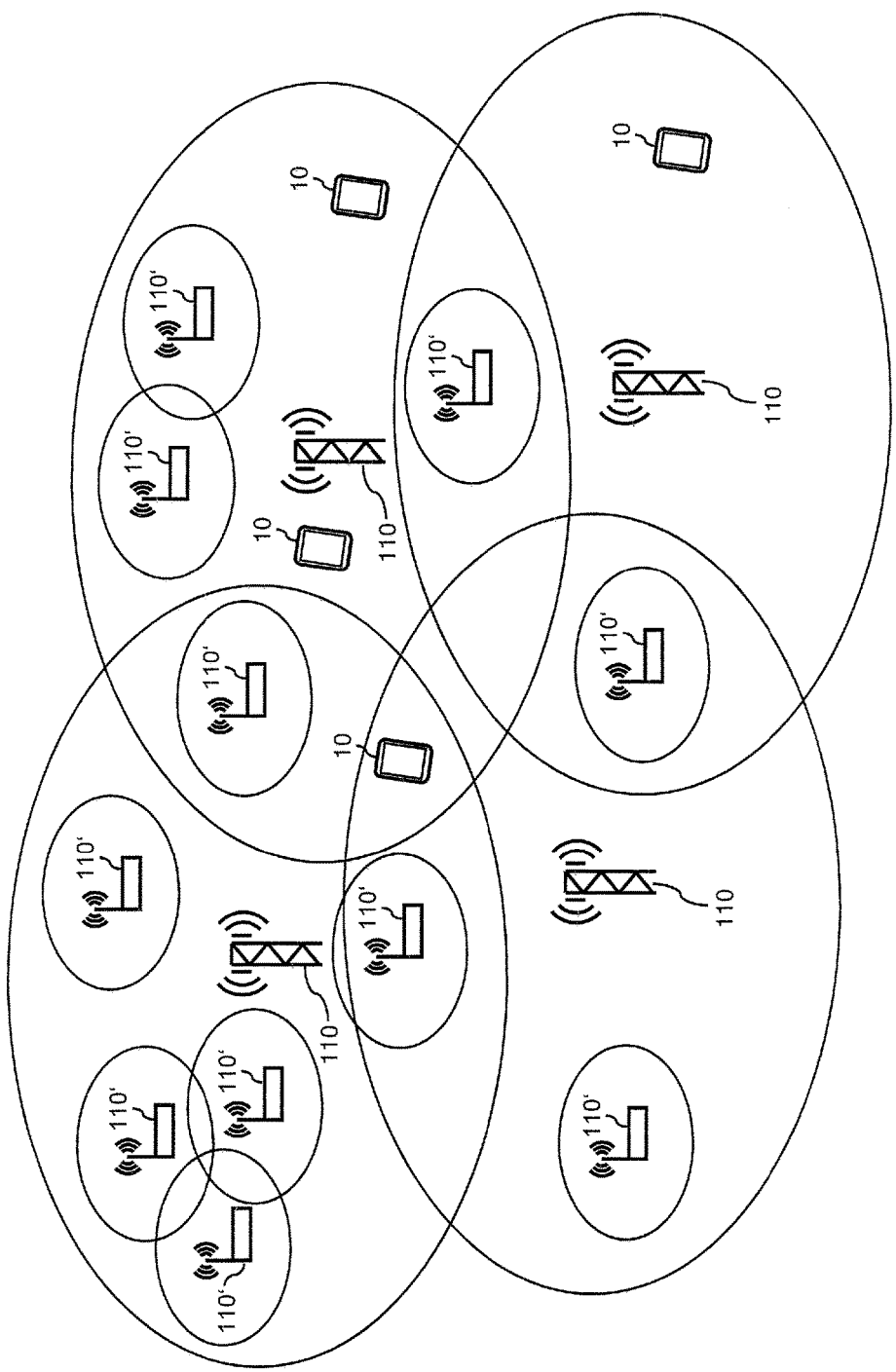
FIG. 1 schematically illustrates a wireless communication network architecture in which access control is implemented according to an embodiment of the invention.

FIG. 1 schematically illustrates a wireless communication network architecture which may be used for implementing the concepts as outlined above. In particular, FIG. 1 illustrates UEs 10 and various access nodes 110, 110' of the cellular network. In the illustrated example, the access nodes 110, 110' are assumed to be base stations 110 serving macro cells and base stations 110' serving small cells, e.g., pico cells or femto cells, within a coverage region of such macro cell. However, it is noted that the illustrated concepts could also be applied in other scenarios, e.g., where the access nodes 110, 110' serve densely distributed small coverage areas.

As mentioned above, the UEs 10 utilize information from AITs received from the wireless communication network to control their respective access to the wireless communication network. Such control of the access may for example relate to a random access procedure performed by the UE 10 for gaining initial access to the wireless communication network or to a paging procedure performed by the wireless communication network to reach a certain UE 10. Further, the information from the AITs may be utilized by the UE 10 for setting a beam-forming configuration, a link adaptation configuration, and/or a HARQ configuration applied when accessing the wireless communication network. The AIT entry including the information which is applicable for a specific access node 110, 110' is identified by the UE 10 on the basis of the identifiers transmitted by each access node 110, 110'. In the following, it will be assumed that the identifiers correspond to an SSI transmitted by each access node 110, 110'. Here, it should be noted that the AIT transmitted by the access nodes 110 and the AIT transmitted by the access node 110', if transmitted, may be different from one another or may be identical.

Broadcast transmissions may be utilized for providing the AITs and the SSIs to the UEs 10. As used herein, a broadcast transmission is considered to be a transmission addressed to all UEs 10 in a certain coverage region of the wireless communication network. The broadcast transmission may be a single frequency network transmission by multiple access nodes 110, 110'. However, other transmission modes could be utilized as well, e.g., unicast transmissions or multicast transmissions. Here, a unicast transmission is considered to be a transmission addressed to one specific UE 10 and a multicast transmission is considered as a transmission which is addressed to a certain group of UEs 10. Also the multicast transmission may be single frequency network transmission by multiple access nodes 110.

The AITs do not need to be transmitted by each access node 110, 110'. In the illustrated example, the AITs are assumed to be transmitted only by the access nodes 110 serving the macro cells, thereby ensuring that the AITs can be received throughout the coverage area of the wireless communication network. Further, each of the base stations 110 serving the macro cells and the base stations 110' serving the small cells broadcasts a corresponding SSI. Here, it is to be understood that the broadcasted SSIs may vary between the access nodes 110, 110'. However, it is also possible that certain access nodes 110, 110' broadcast the same SSI, e.g., when similar access parameters apply for these access nodes 110, 110'. By way of example, in the scenario of FIG. 1 the base stations 110 serving the macro cells could broadcast a first SSI, and the base stations 110' serving the small cells could broadcast a second SSI which is different from the first SSI.

Each SSI may for example define a 10 bit data value, which allows for distinguishing between 1024 different SSIs. The received SSI is utilized by the UE 10 to identify an applicable entry of the received AIT, which defines a configuration to be used by the UE 10 when accessing the wireless communication network.

Figure 2:
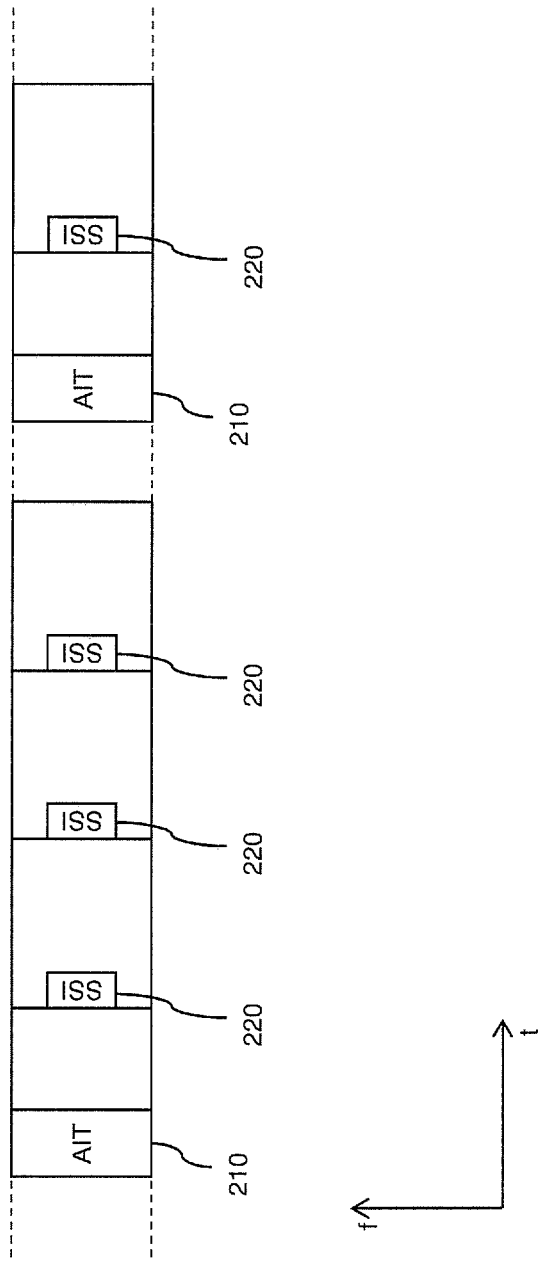
FIG. 2 schematically illustrates transmission of AITs and identifiers according to an embodiment of the invention.

FIG. 2 shows an example of how transmission of the AIT 210 and the SSI 220 may be organized in the time (t) and frequency (f) domain. As illustrated, the SSIs 220 are transmitted more frequently than the AIT 210. For example, a relatively long period, e.g., from 1.024 s up to 10.24 s, may be utilized for transmission of the AIT 210, while a shorter period, e.g., of about 100 ms, may be utilized for transmission of the SSI 220. It should be noted that both periods may be longer than a granularity of resource allocation in the time domain, which may for example be based on time slots in the order of 1 ms.

In concepts as illustrated herein, it is assumed that certain configurations, when being applied in an erroneous way, are more likely to cause problems or cause more severe problems than others. Examples of such configurations which have a high probability of causing problems when applied in an erroneous way are a configuration defining utilization of high transmission power in a random access procedure, configurations defining unusual radio resource allocations for a random access procedure, or configurations defining unusual radio resource allocations for a HARQ (Hybrid Automatic Repeat Request) mechanism. In each of these examples, the deviations from typically used parameters might not only affect an attempted access on the basis of such configuration, resulting in failure of the access, but may also cause interference or other disturbances which affect other access attempts or radio transmissions in the wireless communication network. Accordingly, usage of such configurations should be avoided if the AIT and/or the SSI, on the basis of which such configuration was determined, are found to be invalid. On the other hand, configurations which have a low likelihood of causing problems or cause less severe problems may be utilized by the UE 10 for accessing the cellular network, even if they are based on an outdated AIT and/or SSI, thereby avoiding latency associated with the UE waiting to receive an update of the AIT and/or a new SSI. In other words, some configurations are allowed to be used for accessing the cellular network in an opportunistic way, i.e., on the basis of the presumption that a configuration determined from an invalid AIT and/or SSI will nonetheless work, i.e., result in an successful access to the cellular network, or at least will not adversely affect operation of the wireless communication network, while for other configurations such opportunistic accesses are forbidden.

The illustrated concepts aim at enabling the UE 10 to efficiently determine the validity of system information stored in the UE 10, with a granularity that allows determination of the validity of different parts of the system information, in particular two or more classes which differ with respect to a risk level associated with accessing the wireless communication network based on one or more parameters of this class. Depending on the validity determined for the class and the risk level associated with the class, the UE can then control whether to apply the system information as previously acquired for accessing the wireless communication network. For example, if in the previously acquired system information parameters of a certain class are found to be invalid, and the risk level associated with this class is found to be low, the UE may decide to nonetheless apply the invalid system information for accessing the wireless communication network. On the other hand, if the risk level is found to be high, the UE may decide not to apply the invalid system information and rather wait for an update of the system information. In this way, delays associated with accessing the wireless communication network may be avoided while at the same time avoiding problems caused by access attempts caused by applying erroneous parameters from invalid system information. The risk level of a class may be based on a probability that erroneously using the parameter(s) of the class causes a problem and/or on a severeness level of a problem caused by erroneously using the parameter(s) of the class. The previously acquired system information may correspond to the system information as last acquired by the UE 10. However, in some cases also earlier acquired system information could be used.

For enabling the above-mentioned determination of the validity by the UE, one or more access nodes of the wireless communication network transmit validation information. The validation information may for example include a checksum, a hash, or a sequence number which indicates changes with respect to a previously transmitted version of the system information. The validation information enables determination of the validity individually for one or more of the different classes, i.e., with respect to each risk level. For example, the validation information may include a checksum, a hash, or a sequence number for each of the classes, to indicate changes of the system information on a per class basis. In this way, the risk level associated with invalid parts of the system information may be efficiently indicated by the validation information.

The classification of the system information conveyed by the AIT may be accomplished per parameter type. For example, a given parameter type may be assigned to a certain class, and this class may be the same for all entries of the AIT, i.e., for each access node or coverage area. For example, a parameter type controlling how the UE should derive the initial transmit power for a random access procedure, e.g., for a transmission on a PRACH (Physical Random Access Channel), or a parameter type allocating radio resources to be used for a random access procedure, e.g., radio resources of a PRACH, could be assigned to a class associated with a high risk level. On the other hand, a parameter type controlling an inter-RAT mobility procedure could be assigned to a class associated with a low risk level.

Further, the classification could be accomplished per individual parameter. In this case, parameters of same parameter type could be assigned to different classes, e.g., depending on the value of the parameter and/or depending on the values of one or more other parameters of the same AIT entry. In this case, the class to which parameters of a certain parameter type are assigned may also vary between different entries of the AIT.

In order to enable the UE 10 to determine of the validity of the system information individually per class, the validation information may be divided in parts, i.e., one part per class. If the validation information is based on a checksum or a hash, the validation information may include one checksum or hash for each class. When considering an example with two classes, e.g., a first class corresponding to a low risk level and a second class corresponding to a high risk level, the validation information could include a first checksum or hash for the first class and a second checksum or hash for the second class. For each class, the UE 10 may then compare the hash or checksum received in the validation information to the hash or checksum of the corresponding class in the stored AIT. If the UE 10 finds that the hashes or checksums of a class do not match, it determines the system information of this class as being invalid. Depending on the risk level associated with this class, the UE 10 may nonetheless decide to use the stored system information for controlling its access to the wireless communication network.

The validation information may also be based on at least one sequence number, which is incremented with each change of the system information. In this case, the UE 10 may store one or more sequence numbers associated with the last received AIT or another previously received AIT and determine the validity by comparing the stored sequence number(s) to the sequence number(s) received with the validation information. To enable the determination individually for each class, a single sequence number may be used together with a list of the classes affected by the change of the system information. Further, a single sequence number could be used together with an indication of only the highest risk level class affected by the change of the system information. If the sequence number indicated by the validation information and the sequence number stored in the UE 10 differ by 1, the UE 10 can assess the system information in the stored AIT as being invalid and use the risk level of the highest risk level class affected by the change of the system information for deciding whether to use the stored system information for controlling its access to the wireless communication network. If the difference between the sequence number indicated by the validation information and the sequence number stored in the UE 10 is more than 1, the UE 10 might not be able to reliably determine the classes that were affected by changes of the system information and assume a worst case, namely that the class with the highest risk level was affected. Depending on the risk level associated with the highest risk level class, the UE 10 may then decide whether to use the stored system information for controlling its access to the wireless communication network. To enable the determination individually for each class, it is also conceivable to use a separate sequence number per class. In this case the UE 10 could reliably derive the affected class(es) even after several consecutive changes of the system information.

As mentioned above, when deciding whether to attempt accessing the wireless communication network using previously acquired and stored system information configuration, the UE's 10 decision when the system information is found to be invalid with respect to at least one class may further depend on the risk level of the affected class(es). Depending on this information, the UE 10 may also decide on which further actions to be performed in connection with the access attempt.

For example, the system information may be organized in three different classes, corresponding to a low risk level, referred to as "class 0", a medium risk level, referred to as "class 1", and a high risk level, referred to as "class 2". In this case, the UE 10 may decide according to the following rules: If the highest risk level class affected by the change of the system information is class 0, the UE 10 may proceed with accessing the wireless communication network based on the stored system information and acquire an update of the system information, e.g., in the form of an updated version of the AIT. This may be accomplished at the next regular transmission occasion of the system information, e.g., according to a schedule as illustrated in FIG. 2. If the highest affected class is class 1, the UE 10 may proceed with accessing the wireless communication network based on the stored system information and, when the access attempt was successful, immediately request an update of the system information, e.g., an updated version of the AIT. In this way, a valid system information can be obtained with minimal delay. If the highest affected class is class 2, the UE 10 may decide postpone its access attempt until it has acquired an update of the system information at the next regular transmission of the system information, e.g., in the form of an updated version of the AIT. Once the update of the system information is received, the UE 10 has valid system information even for class 2 and can the proceed with the access attempt using valid system information.

According to a further example, the system information may be organized in two different classes, corresponding to a low risk level, referred to as "class 0", and a high risk level, referred to as "class 1". In this case, the UE 10 may decide according to the following rules: If the highest risk level class affected by the change of the system information is class 0, the UE 10 may proceed with accessing the wireless communication network based on the stored system information and acquire an update of the system information, e.g., in the form of an updated version of the AIT. This may be accomplished at the next regular transmission occasion of the system information, e.g., according to a schedule as illustrated in FIG. 2. If the highest affected class is class 1, the UE 10 may decide postpone its access attempt until it has acquired an update of the system information at the next regular transmission of the system information, e.g., in the form of an updated version of the AIT. Once the update of the system information is received, the UE 10 has valid system information even for class 1 and can the proceed with the access attempt using valid system information.

In some scenarios, the actions performed by the UE 10 may also depend on assessing further criteria in addition to the risk level(s) of the classes affected by the change of the system information. For example, the UE 10 may also consider contextual aspects, such as a type of access node or cell where the access would be attempted, e.g., whether the access attempt is in a macro cell or a small cell, a priority level or QoS requirement of an application or service triggering the access attempt, e.g., whether the access attempt is triggered by a latency sensitive application or service, such as an emergency service or an automatic safety action trigger in an industrial or smart grid system, a subscription type of the UE 10 or policies associated with the subscription, e.g., whether the UE 10 has a premium level description, capabilities of the UE 10, and/or battery or energy status of the UE 10. By way of example, an energy deprived UE 10 might proceed with the network access procedure despite detecting a change in a part of the system information which corresponds to a high risk level class, while the UE 10 might postpone its access attempt if it has sufficient energy. Further, if the access attempt is triggered by a latency intolerant service, e.g., such as an automatic safety application or an emergency call, UE 10 might proceed with the network access procedure despite detecting a change in a part of the system information which corresponds to a high risk level class.

It is noted that the above-mentioned actions and rules are mentioned as examples and that alternative or additional rules could be defined. Further, it is noted that the rules and/or actions may be preconfigured in the UE 10, e.g., stored in manufacturer and/or operator settings. Further, such rules could also be configured by the wireless communication network.

The validation information may be periodically transmitted by one or more of the access nodes 110, 110', e.g., using broadcast transmissions. This may be accomplished with a frequency that is equal to or preferably greater than the frequency with which the system information is transmitted. For example, the validation information could be transmitted in conjunction with the above-mentioned SSI.

It is not required that the UE 10 knows how the system information is organized into the different classes, e.g., which parts/parameters of the system information belong to which class. Rather, it may be sufficient if the UE 10 uses the validation information to determine whether a change of the system information has affected a certain class. This can be accomplished by comparing the received validation information to stored validation information, e.g., by comparing a stored sequence number, hash, or checksum included in previously received validation information to a sequence number, hash, or checksum included in newly received validation information. Accordingly, the UE 10 does not need to know the assignment of the parameters of the system information to the classes for calculating a hash, checksum, or the like. The detailed way of classifying the system information may thus be decided on the network side, e.g., according to an individual operator policy, and does not need to be indicated to the UE.

In some scenarios the relation of affected class(es) to actions performed by the UE 10 may be ambiguous, i.e., the UE cannot unambiguously derive the action(s) it should perform from the affected class(es), e.g., because the UE 10 may also consider other information, e.g., contextual information, than the affected classes when deciding on the action(s) to perform. This may require more complex decisions by the UE 10, for which the UE 10 may need to know the specific risk level class of at least some parameters of the system information. For example, if the validation information indicates that a certain class is affected by a change of system information, the UE 10 may decide on the basis of contextual information between performing a first action if a certain parameter type is part of the affected class, or performing a second action if this parameter type is not part of the affected class. For supporting such scenarios, the UE 10 may be provided with information on the classification of the system information.

One option to inform the UE 10 about the classification is to preconfigure information on the classification of the system information in the UE 10. For example, the classification could be defined in a standard, and the UE 10 could be preconfigured with information based on the standard. For example, the information on the classification of the system information could be hardcoded in the UE 10. Further, information on the classification of the system information could be defined in operator specific configurations of the UE 10. The latter could for example be stored in a USIM (Universal Subscriber Identity Module) of the UE 10. The information on the classification of the system information could then be stored or updated by Over The Air USIM configuration methods, e.g., carried by SMS (Short Message Service).

A further option is to configure the UE 10 with the information on the classification of the system information during a network attach procedure, i.e., a procedure when the UE 10 first contacts the network after having been powered on or after returning to coverage after having been out of coverage for so long time that it has been detached from the network. One variant of this option would be that the UE 10 is configured with the information on the classification of the system information only when a certain subscriber first uses the UE 10 to the wireless communication network, e.g., in the first network attach procedure after activating the subscription on this UE 10. Accordingly, when the UE 10 does not yet have information on the classification of the system information for a PLMN (Public Land Mobile Network) it is attaching/connecting to, it is provisioned with this information. For this purpose, known provisioning procedures, such as bootstrap provisioning, may be used. For example, such provisioning may involve that the UE 10 requests the information on the classification of the system information from the wireless communication network.

A further option of providing the UE 10 with the information on the classification of the system information is to include this information in the system information. For example, the information on the classification of the system information could be included in an "ingress" part of the AIT, i.e., a part of the AIT that precedes the list of entries with system information configurations and which is valid for all system information configurations in the AIT. A corresponding example of an AIT is illustrated in FIG. 3A.

In the example of FIG. 3A, the classes of the system information, designated as "risk level class 0", "risk level class 1", and "risk level class 2", are defined in terms of parameter types. A parameter type "X" is assigned to risk level class 2, parameter types "Y" and "Z" are assigned to risk level class 1, and all other parameter types, e.g., "0", are assigned to risk level class 0.

A further option of providing the UE 10 with the information on the classification of the system information is to include an individual indication of the class for each parameter in the system information. This offers maximum freedom for optimizing the classification. A corresponding example of an AIT is illustrated in FIG. 3B. In the example of FIG. 3B, each parameter (which may be of type "X", "Y", "Z", or "0", is stored together with a corresponding RLC (Risk Level Class) indication, where "RLC=0" indicates that the parameter is assigned to risk level class 0, "RLC=1" indicates that the parameter is assigned to risk level class 1, and "RLC=2" indicates that the parameter is assigned to risk level class 2. As compared to the example of FIG. 3A, this allows for assigning multiple instances of the same parameter type to different classes.

In the above examples, the same validation information is used for all system information. In some situations, this may result in a too critical assessment of the risk level associated with using invalid system information, because the AIT may include system information configurations which are not utilized in the coverage area where the UE 10 is located. If the validation information indicates a change which has occurred in one of the latter system information configurations, the change may actually irrelevant for the UE 10. This issue may be addressed by providing the validation information and classification system information configuration, i.e., per table entry in the AIT. For this purpose, the parameters within a system information configuration would be divided into different sets, each belonging to a certain risk level class. The validation information may then be provided separately for each of these sets. For example, a corresponding version of the validation information could be transmitted together with each of the different SSIs. A corresponding example is illustrated in FIG. 3C. FIG. 3C shows an AIT which does not include information on the classification of the system information. The classification is assumed to include a risk level class 0, and a risk level class 1. The parameter types "X" and "Y" are assumed to be assigned to risk level class 1, which is illustrated by dotted frames of the corresponding table fields, and the parameter types "Z" and "0" are assumed to be assigned to risk level class 0, which is illustrated by dotted frames of the corresponding table fields. First validation information is transmitted for the system information configuration corresponding to SSI=1. For the parameters identified by SSI=1, validity is indicated by the first validation information, individually for the risk level class 1 and the risk level class 2. For example, the first validation information may include a first hash, checksum, or sequence number for the risk level class 1 and a second hash, checksum, or sequence number for the risk level class 2. For the parameters identified by SSI=2, validity is indicated by the second validation information indicates the validity, individually for the risk level class 1 and the risk level class 2. For example, the first validation information may include a first hash, checksum, or sequence number for the risk level class 1 and a second hash, checksum, or sequence number for the risk level class 2.

In some examples the validation information may be part of the SSI. For example, the hashes or checksums of the validation information could be encoded by the SSI. In this case, a change of the system information configuration in an entry in the AIT would also result in a change of the corresponding SSI. To accommodate the possibility that different system information configurations may happen to produce the same hashes/checksums, the SSI may further include a serial number or the like. Accordingly, when for example assuming that the SSI is based on two hashes of the validation information, designated as hash1 and hash2, corresponding to two different risk level classes, the SSI could be determined according to the following relation:

$$SSI = hash1 \| hash2 \| SN, \qquad (1)$$

where SN designates the serial number and $\|$ indicates a concatenation operation.

According to a variant, the hashes or checksums in the SSI could be replaced with "sub-SSIs", such that an SSI would consist of concatenated sub-SSIs, e.g., as given by:

$$SSI = \text{sub-SSI}a \| \text{sub-SSI}b \| \text{sub-SSI}c. \qquad (2)$$

In this case, each sub-SSI could be associated with one of the different risk level classes. This may be illustrated by considering an example in which the system information configuration consists of parameters A, B, C, and D, and parameters A and B are classified as risk level class 0, while parameters C and D are classified as risk level class 1. In this case, there would be one sub-SSI associated with the parameters A and B and another sub-SSI associated with the parameters C and D. It is not required that the different sets of parameters associated with different sub-SSIs are part of the same system information configurations in the AIT. Instead, rather they could be listed separately as building blocks for a complete system information configuration. The wireless communication network may then decide how to combine any of these building blocks into a complete system information configuration. The particular combination that is being used would be indicated by the sub-SSIs in the transmitted SSI. A corresponding example of an AIT consisting of such building blocks is illustrated in FIG. 3D. In the example of FIG. 3D, the AIT has multiple entries which are each identified by a corresponding sub-SSI which each include a building block with a set of parameters, which may be of type "X", type "Y", type "Z", or type "0". The parameter sets are of type "A", "B", and "C". For example, the sub-SSI "Sub-SSI$a=1$" identifies a parameter set of type A with parameter values X=0 and Y=2. The parameter sets of type A are assigned to risk level class $\alpha$, the parameter sets of type B are assigned to risk level class $\beta$, and the parameter sets of type B are assigned to risk level class $\gamma$. In this example an SSI would consist of one sub-SSIa concatenated with one sub-SSIb and one sub-SSIc and the corresponding system information configuration would consist of the parameters, with their respective values, associated with these sub-SSIs. Accordingly, a complete system information configuration would consist of parameters of type X, Y, Z, Q and P. The risk level classes $\alpha$, $\beta$ and $\gamma$ could all be different or two or more of them could be the same. By separating parameters of the same risk level class into different parameter sets, the flexibility of defining system information configurations by building blocks may be increased.

Figure 4:
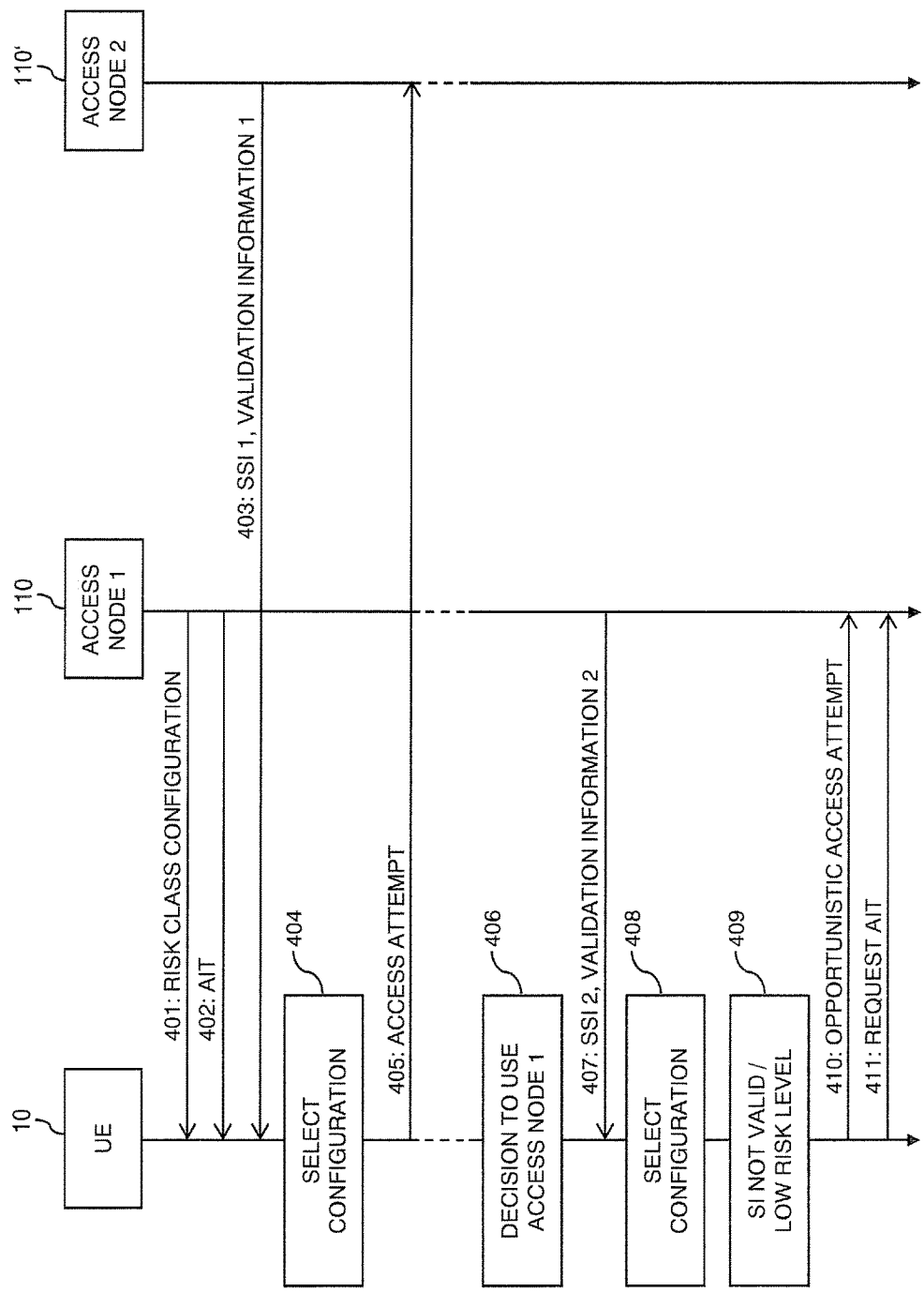
FIG. 4 shows exemplary processes according to an embodiment of the invention.

FIG. 4 shows exemplary processes which are based on the concepts as outlined above. The processes of FIG. 4 involve the UE 10, a first access node 110, and a second access node 110'. For example, the first access node 110 and the second access node 110' may be part of a deployment as illustrated in FIG. 1.

As illustrated by message 401, the UE 10 may receive a risk class configuration from the wireless communication network. In the example of FIG. 4, the message 401 indicating the risk class configuration is transmitted by the first access node 110. However, it is noted that the message 401 could be transmitted by any other node of the wireless communication network, e.g., during a provisioning procedure or when the UE 10 initially attaches to the wireless communication network. The risk class configuration may define how parameters of the system information are assigned to different risk level classes, e.g., per parameter type.

As illustrated by message 402, the first access node 110 transmits an AIT which is received by the UE 10. The message 402 may for example be a broadcast message which can be received by all UEs in the coverage area of the first access node 110. The AIT may for example be organized as explained in connection with the examples of FIG. 3A, 3B, 3C, or 3D. In addition or as an alternative to the information conveyed by message 401, the AIT of message 402 may include information defining how parameters of the system information are assigned to different risk level classes, e.g., per individual parameter or per parameter set. The UE 10 stores the received AIT to be used for later access attempts to the wireless communication network. In the example of FIG. 4, it is assumed that the AIT includes at least a system information configuration to be used by the UE 10 for accessing the wireless communication network in a coverage area of the first access node 110 and a system information configuration to be used by the UE 10 for accessing the wireless communication network in a coverage area of the second access node 110'.

As illustrated by message 403, the second access node 110' transmits an SSI, denoted as "SSI 1". The SSI from the second access node 110' is received by the UE 10. The message 403 may for example be a broadcast message which can be received by all UEs in the coverage area of the second access node 110'. In the illustrated example, the message 403 also includes validation information which enables the UE 10 to determine validity of the system information included in the received AIT. For example, the validation information could be transmitted as part of the SSI, e.g., by encoding a hash or checksum in the SSI 1. The UE 10 also stores the received validation information.

The UE 10 may then use the SSI 1 for selecting a system information configuration from the AIT, as illustrated by block 404. In the example of FIG. 4, it is assumed that at this point the validation information indicates that the system information in the AIT is valid, and the UE 10 thus proceeds by attempting to access the wireless communication network via the second access node 110', as illustrated by message 405.

At a later point of time, the UE 10 may then decide to attempt accessing the wireless communication network via the first access node 110, as illustrated by block 406. For example, this may be due to the UE 10 having left the coverage area of the second access node 110'.

As illustrated by message 407, the UE 10 receives an SSI from the first access node 110, denoted as "SSI 2". The UE 10 may use the SSI 2 from the first access node 110 for identifying a system configuration in the AIT which is applicable for the first access node 110. In conjunction with the SSI 2 from the first access node 110 the UE 10 also receives further validation information, denoted as "validation information 2". The message 407 may for example be a broadcast message which can be received by all UEs in the coverage area of the first access node 110. The further validation information could be transmitted as part of the SSI, e.g., by encoding a hash or checksum in the SSI 2. The UE 10 also stores the received further validation information. At this point, the UE 10 does not receive any update of the previously received AIT.

As illustrated by block 408, the UE 10 then uses the SSI 2 received from the first access node 110 for selecting a system information configuration from the AIT, to be used for accessing the wireless communication network via the first access node 110. However, before proceeding to an access attempt, the UE 10 checks the validity of latest received system information, in the present example the system information in the AIT received with message 402. For this purpose, the UE 10 may compare the further validation information received with message 407 to the previously received validation information received with message 403. Alternatively, the UE 10 could compare the further validation information to information derived from the AIT, e.g., to a hash or checksum derived from the AIT. In the example of FIG. 4, it is assumed that at this point the further validation information indicates that the stored system information from the previously received AIT is invalid, i.e., that there has been a change of the system information as compared to the system information in the AIT previously received by the UE 10. Based on the validation information, the UE 10 also determines the risk level class(es) affected by this change of the system information. In other words, the UE 10 determines the validity of the stored system information individually with respect to one or more of the risk level classes. As illustrated by block 409, the example of FIG. 4 assumes that the stored system information is invalid with respect to at least one of the risk level classes, but that the risk level class(es) affected by the change of the system information corresponds to a low risk level.

Accordingly, the UE 10 proceeds by performing an opportunistic access attempt with the first access node 110, as illustrated by message 410. That is to say, irrespective of the stored system information being invalid, the UE 10 uses one or more parameters of this system information for attempting to access the wireless communication network via the first access node 110.

If the opportunistic access attempt of the UE 10 is successful, the UE 10 may then proceed by requesting an update of the AIT from the first access node, as illustrated by message 410. However, in some cases the UE 10 may also simply wait for the next regular transmission location of the AIT by the first access node 110 to receive an updated version of the AIT.

It is noted that although the above examples assume that an AIT is used for conveying the system information, the illustrated concepts are not limited to using an AIT for conveying the system information, and that the above-described organization of the system information in classes of different risk level may also be applied in connection with other mechanisms for conveying the system information. For example, in the case of the LTE RAT, the classes could be defined per SIB. In this case, a certain SIB could be assigned to a given risk level and corresponding class. Different SIBs may be assigned to different classes. However, some SIBs could also be assigned to the same class. Further, each parameter of the SIB could be classified separately and assigned to one of at least two different classes.

Figure 5:
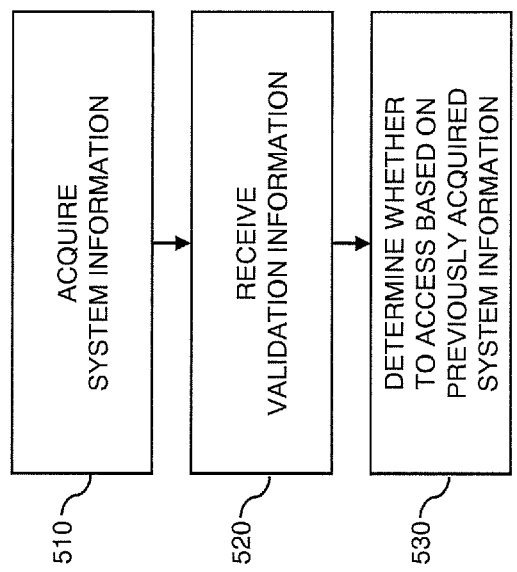
FIG. 5 shows a flowchart for schematically illustrating a method performed by a radio device according to an embodiment of the invention.

FIG. 5 shows a flowchart for illustrating a further method of controlling radio transmissions in a wireless communication network. The method of FIG. 5 may be utilized for implementing the illustrated concepts in radio device, e.g., in a UE, such as one of the UEs 10. If a processor-based implementation of the radio device is used, the steps of the method may be performed by one or more processors of the radio device. In such a case the radio device may further comprise a memory in which program code for implementing the below described functionalities is stored.

At step 510, the radio device acquires system information from the wireless communication network. The system information includes parameters for controlling access of the radio device to the wireless communication network. The system is organized in at least two classes differing with respect to a risk level associated with accessing the wireless communication network based on one or more parameters of the class. The risk level of each class may be based on a probability that a problem is caused by accessing the wireless communication network based on one or more parameters of the class causes a problem. In addition or as an alternative, the risk level of each class is based on a severeness level of a problem caused by accessing the wireless communication network based on one or more parameters of the class. Accordingly, the risk level may reflect how critical erroneous settings of certain parameters of the system information might be.

For acquiring the system information, the radio device may receive an identifier from the wireless communication network. An example of such identifier is the above-mentioned SSI. Based on the received identifier, the radio device may then acquire the system information. For example, the radio device may receive the system information in an AIT and utilize the identifier to acquire the system information by identifying, in the AIT, at least one entry including the system information. The AIT may for example be organized as explained in connection with the examples of FIG. 3A, 3B, 3C, or 3D. In some scenarios, the identifier may also correspond to a signature sequence utilized by the radio device to synchronize with an access node of the wireless communication network. The identifier could then correspond to a PSS and/or SSS as used in the LTE RAT. As for example illustrated in FIG. 2, the identifier may be transmitted more frequently than the system information.

At step 520, the radio device receives validation information. The validation information enables the radio device to determine, individually for at least one of the classes, validity of the system information as previously acquired by the radio device. The previously acquired system information may correspond to the system information as last acquired by the radio device. However, in some cases the previously acquired system information could also be acquired at an earlier point of time. Based on the validation information the radio device may determine the validity of the system information for each of the different classes. However, in some scenarios it may also be sufficient if the radio device determines the validity with respect to only one of the classes, e.g., the class associated with the highest risk level. As explained above, the validation information is preferably transmitted more frequently than the system information.

If the radio device uses the above-mentioned identifier for acquiring the system information, the radio device may receive the validation information in conjunction with a transmission of the identifier. For example, the radio device may receive the validation information as part of the identifier. Further, the validation information could be included in the same radio transmission as the identifier, e.g., prepended or appended to the identifier. The radio device may receive the identifier and then use this identifier for identifying one or more entries of an AIT which include the system information to be applied by the radio device. The radio device may then receive a further transmission of the identifier from the wireless communication network and receive the validation information in conjunction with the further transmission of the identifier. In some scenarios, the radio device may receive first validation information in conjunction with a first transmission of the identifier and second validation information in conjunction with a second transmission of the identifier and then determine the validity of the previously acquired system information depending on a comparison of the second validation information to the first validation information.

The validation information may be based on a hash and/or checksum of the system information. Further, the validation information may be based on a sequence number which is adjusted with each update of the system information, e.g., by incrementing the sequence number by one or some other increment value.

At step 530, the radio device determines whether to access the wireless communication network based on the system information as previously acquired by the radio device. This is accomplished depending on the validity and the risk level associated with at least one of the classes. In particular, the radio device may in some cases decide to attempt accessing the wireless communication network even though the system information is found to be invalid with respect to at least one of the classes, e.g., if the class(es) where the system information is found to be invalid correspond to a low risk level.

In response to determining not to access the wireless communication network on the basis of the system information as previously acquired by the radio device, the radio device may access the wireless communication network after receiving an update of the system information. In response to determining to access the wireless communication network on the basis of the system information as previously acquired by the radio device, the radio device may access the wireless communication network and request an update of the system information, as also shown in the example of FIG. 4.

It is noted that, in addition to the validity and the risk level, the determination made by the radio device at step 530 may also depend on further criteria, e.g., contextual information or other access-control related parameters, such as access barring.

Figure 6:
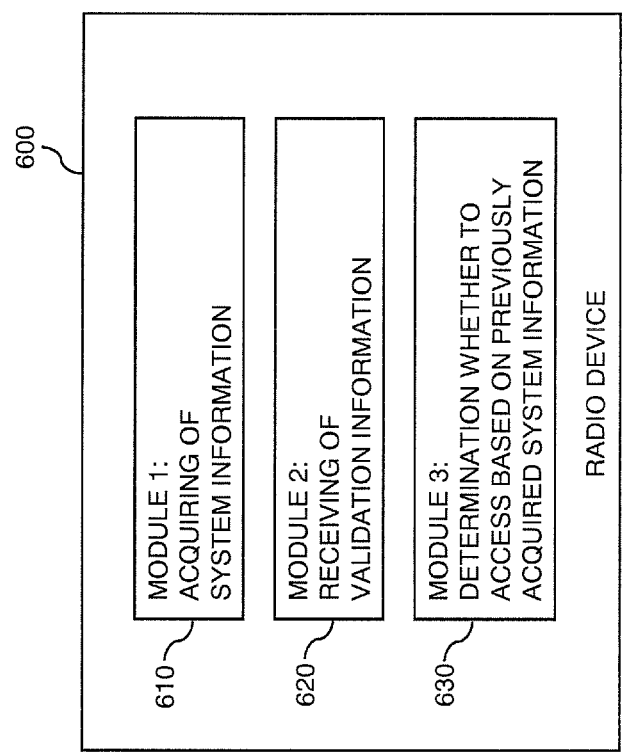
FIG. 6 shows a block diagram for illustrating functionalities of a radio device according to an embodiment of the invention.

FIG. 6 shows a block diagram for illustrating functionalities of a radio device 600 which operates according to the method of FIG. 5. As illustrated, the radio device 600 may be provided with a module 610 configured to acquire system information, such as explained in connection with step 510. Further, the radio device 600 may be provided with a module 620 configured to control receiving validation information, such as explained in connection with step 520. Further, the radio device 600 may be provided with a module 630 configured to determine whether to access to the wireless communication network on the basis of the system information as previously acquired by the radio device, such as explained in connection with step 530.

It is noted that the radio device 600 may include further modules for implementing other functionalities, such as known functionalities of a UE supporting the LTE RAT or a 5G RAT. Further, it is noted that the modules of the radio device 600 do not necessarily represent a hardware structure of the radio device 600, but may also correspond to functional elements, e.g., implemented by hardware, software, or a combination thereof.

Figure 7:
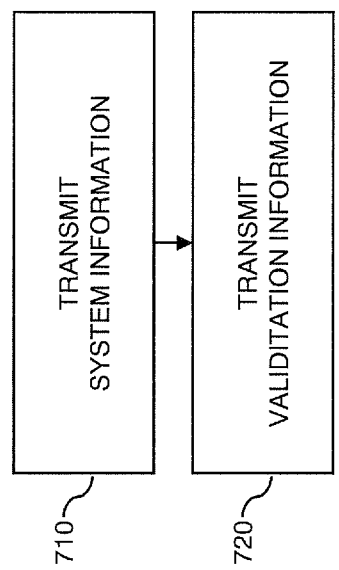
FIG. 7 shows a flowchart for schematically illustrating a method performed by an access node according to an embodiment of the invention.

FIG. 7 shows a flowchart for illustrating a method of controlling radio transmissions in a wireless communication network. The method of FIG. 10 may be utilized for implementing the illustrated concepts in an access node of the wireless communication network, such as one of the above-mentioned access nodes 110. If a processor-based implementation of the access node is used, the steps of the method may be performed by one or more processors of the access node. In such a case the node may further comprise a memory in which program code for implementing the below described functionalities is stored.

At step 710, the access node transmits system information to at least one radio device in a coverage area of the access node, such as to one or more of the above-mentioned UEs 10. The system information includes parameters for controlling access of the radio device to the wireless communication network. The system is organized in at least two classes differing with respect to a risk level associated with accessing the wireless communication network based on one or more parameters of the class. The risk level of each class may be based on a probability that a problem is caused by accessing the wireless communication network based on one or more parameters of the class causes a problem. In addition or as an alternative, the risk level of each class is based on a severeness level of a problem caused by accessing the wireless communication network based on one or more parameters of the class. Accordingly, the risk level may reflect how critical erroneous settings of certain parameters of the system information might be.

In some scenarios, the access node may transmit an identifier to the at least one radio device. This identifier enables the radio device(s) to acquire the system information. An example of such identifier is the above-mentioned SSI. For example, the access node may transmit the system information in an AIT, and the identifier may enable the radio device(s) to acquire the system information by identifying, in the AIT, at least one entry including the system information. The AIT may for example be organized as explained in connection with the examples of FIG. 3A, 3B, 3C, or 3D. In some scenarios, the identifier may also correspond to a signature sequence utilized by the radio device to synchronize with an access node of the wireless communication network. The identifier could then correspond to a PSS and/or SSS as used in the LTE RAT. As for example illustrated in FIG. 2, the identifier may be transmitted more frequently than the system information.

At step 720, the access node transmits validation information. The validation information enables the at least one radio device to determine, individually for at least one of the classes, validity of the system information as previously acquired by the radio device. Based on the validation information the at least one radio device may determine the validity of the system information for each of the different classes. However, in some scenarios it may also be sufficient if the at least one radio device determines the validity with respect to only one of the classes, e.g., the class associated with the highest risk level. As explained above, the validation information is preferably transmitted more frequently than the system information.

If the at least one radio device uses the above-mentioned identifier for acquiring the system information, the access node may transmit the validation information in conjunction with a transmission of the identifier. For example, the access node may transmit the validation information as part of the identifier. Further, the validation information could be included in the same radio transmission as the identifier, e.g., prepended or appended to the identifier. The access node may transmit the identifier to be used by the at least one radio device for identifying one or more entries of an AIT which includes the system information to be applied by the at least one radio device. The access node may then perform a further transmission of the identifier and transmit the validation information in conjunction with the further transmission of the identifier. In some scenarios, the access node may transmit first validation information in conjunction with a first transmission of the identifier and second validation information in conjunction with a second transmission of the identifier. This may enable the at least one radio device to determine the validity of the previously acquired system information depending on a comparison of the second validation information to the first validation information.

The validation information may be based on a hash and/or checksum of the system information. Further, the validation information may be based on a sequence number which is adjusted with each update of the system information, e.g., by incrementing the sequence number by one or some other increment value.

Figure 8:
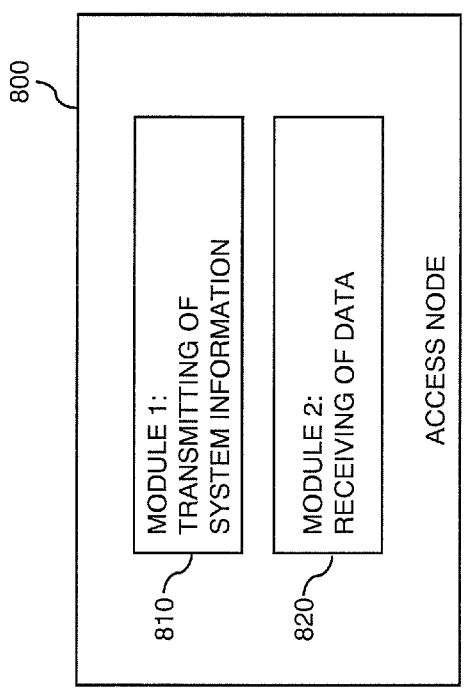
FIG. 8 shows a block diagram for illustrating functionalities of an access node according to an embodiment of the invention.

FIG. 8 shows a block diagram for illustrating functionalities of an access node 800 which operates according to the method of FIG. 7. As illustrated, the access node 800 may be provided with a module 810 configured to transmit system information, such as explained in connection with step 710. Further, the access node 800 may be provided with a module 820 configured to transmit validation information, such as explained in connection with step 720.

It is noted that the access node 800 may include further modules for implementing other functionalities, such as known functionalities of an access node, such as an eNB of the LTE RAT or an access node of a 5G RAT. Further, it is noted that the modules of the access node 800 do not necessarily represent a hardware structure of the access node 800, but may also correspond to functional elements, e.g., implemented by hardware, software, or a combination thereof.

Further, it is to be understood that the methods of FIGS. 5 and 7 may be combined with each other, e.g., in a system including at least one access node operating according to the method of FIG. 5 and one or more radio devices operating according to the method of FIG. 7.

Figure 9:
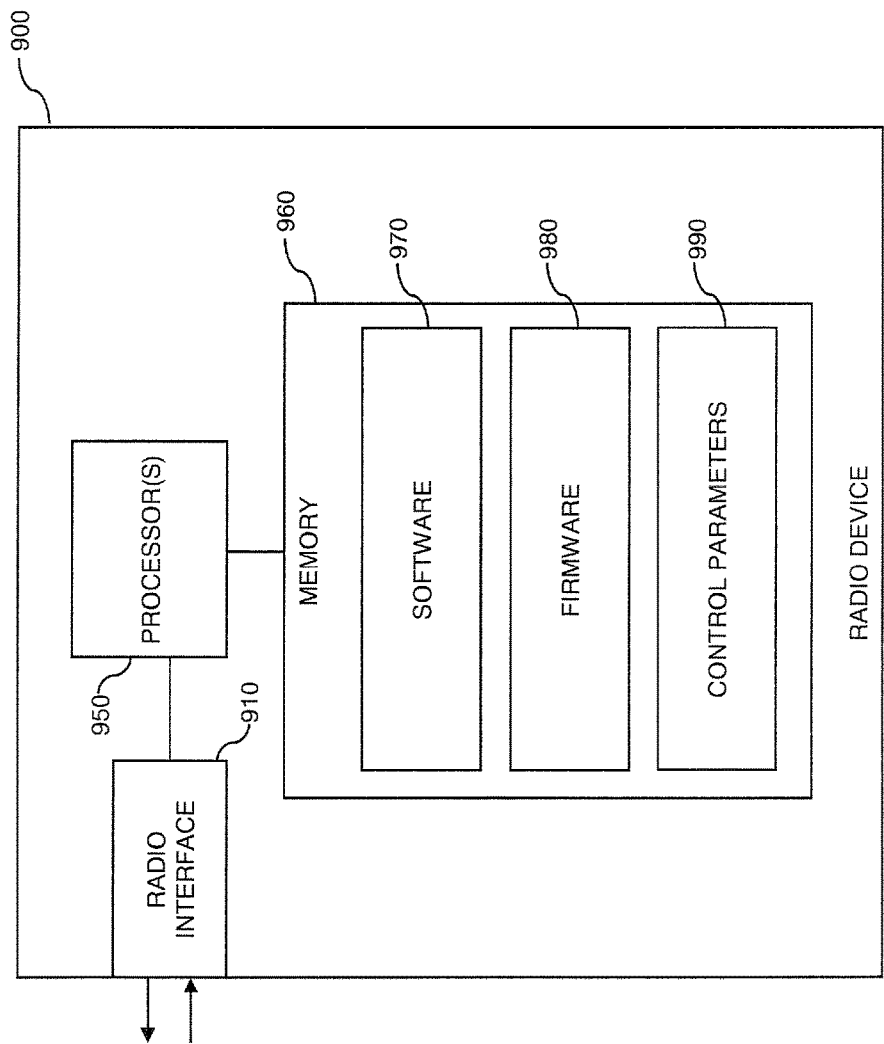
FIG. 9 schematically illustrates a radio device according to an embodiment of the invention.

FIG. 9 illustrates a processor-based implementation of a radio device 900 which may be used for implementing the above described concepts. The radio device 900 may correspond to a radio device operating according to the method of FIG. 6, such as one of the UEs 10 illustrated in FIG. 1.

As illustrated, the radio device 900 may include a radio interface 910 for connecting to a wireless communication network, e.g., via an access node of the wireless communication network, such as one the above-mentioned access node 110, 110' or the access node in the method of FIGS. 6 and 8. The radio interface may for example be used for receiving the system information and/or validation information.

Further, the radio device 900 may include one or more processors 950 coupled to the radio interface 910 and a memory 960 coupled to the processor(s) 950. By way of example, the radio interface 910, the processor(s) 950, and the memory 960 could be coupled by one or more internal bus systems of the radio device 900. The memory 960 may include a Read Only Memory (ROM), e.g., a flash ROM, a Random Access Memory (RAM), e.g., a Dynamic RAM (DRAM) or Static Ram (SRAM), a mass storage, e.g., a hard disk or solid state disk, or the like. As illustrated, the memory 960 may include software 970, firmware 980, and/or control parameters 990. The memory 960 may include suitably configured program code to be executed by the processor(s) 950 so as to implement the above-described functionalities of a radio device, such as explained in connection with FIG. 6. This program code may be stored as part of the software 970 and/or as part of the firmware 980. Further, this program code may operate using one or more of the control parameters 990.

It is to be understood that the structures as illustrated in FIG. 9 are merely schematic and that the radio device 900 may actually include further components which, for the sake of clarity, have not been illustrated, e.g., further interfaces or processors. Also, it is to be understood that the memory 960 may include further program code for implementing known functionalities of a radio device, e.g., known functionalities of a UE supporting the LTE radio technology or a 5G radio technology. According to some embodiments, also a computer program may be provided for implementing functionalities of the radio device 900, e.g., in the form of a physical medium storing the program code and/or other data to be stored in the memory 960 or by making the program code available for download or by streaming.

Figure 10:
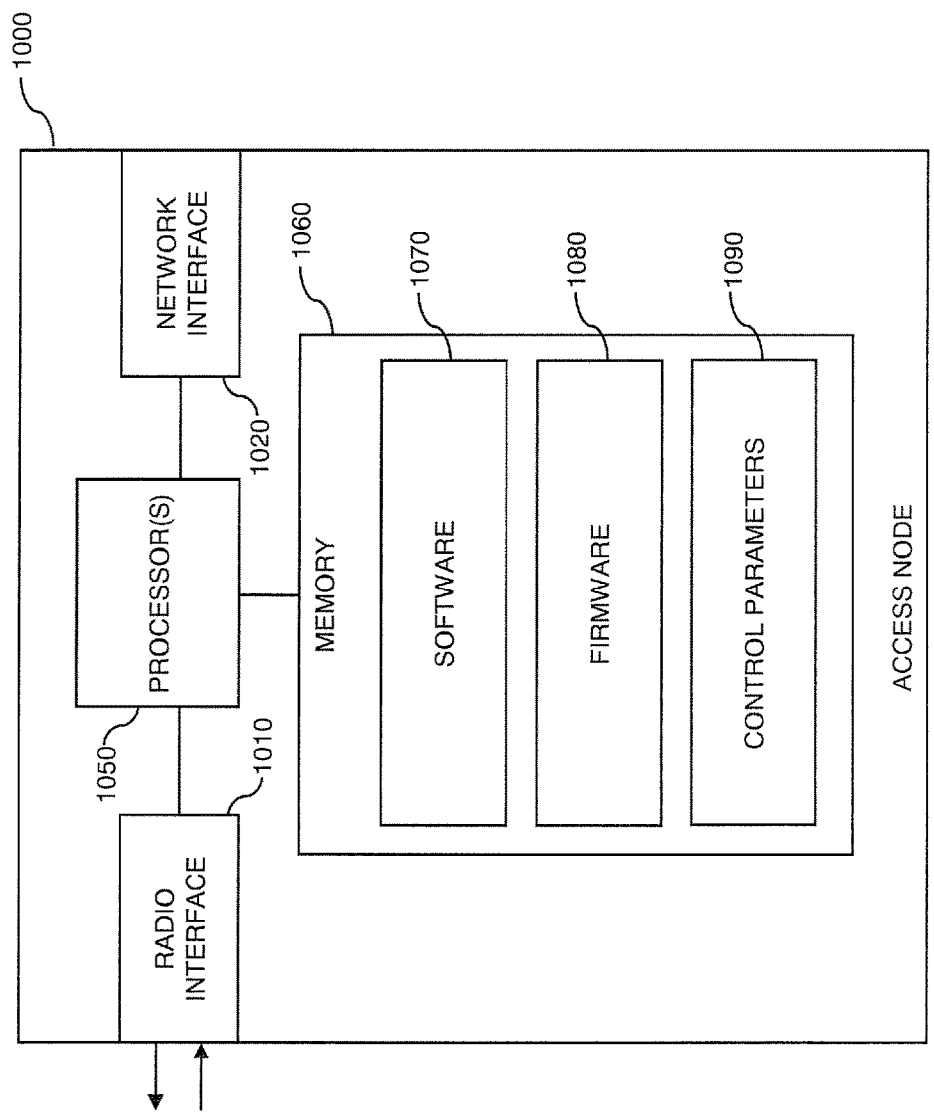
FIG. 10 schematically illustrates an access node according to an embodiment of the invention.

FIG. 10 illustrates a processor-based implementation of an access node 1000 which may be used for implementing the above described concepts. The access node 1000 may correspond to an access node operating according to the method of FIG. 8, such as one of access nodes 110 illustrated in FIG. 1.

As illustrated, the access node 1000 may include a radio interface 1010 for connecting to one or more radio devices, such as the above-mentioned UEs 10 or the radio device(s) in the methods of FIGS. 6 and 8. The radio interface may for example be used for sending the system information and/or validation information. Further, the access node 1000 may include a network interface 1020 for connecting to one or more other nodes of the wireless communication network. The network interface 1020 may for example be used for establishing a backhaul connection of the access node 1000.

Further, the access node 1000 may include one or more processors 1050 coupled to the interfaces 1010, 1020 and a memory 1060 coupled to the processor(s) 1050. By way of example, the interfaces 1010, 1020 the processor(s) 1050, and the memory 1060 could be coupled by one or more internal bus systems of the access node 1000. The memory 1060 may include a ROM, e.g., a flash ROM, a RAM, e.g., a DRAM or SRAM, a mass storage, e.g., a hard disk or solid state disk, or the like. As illustrated, the memory 1060 may include software 1070, firmware 1080, and/or control parameters 1090. The memory 1060 may include suitably configured program code to be executed by the processor(s) 1050 so as to implement the above-described functionalities of an access node, such as explained in connection with FIG. 8. This program code may be stored as part of the software 1070 and/or as part of the firmware 1080. Further, this program code may operate using one or more of the control parameters 1090.

It is to be understood that the structures as illustrated in FIG. 10 are merely schematic and that the access node 1000 may actually include further components which, for the sake of clarity, have not been illustrated, e.g., further interfaces or processors. Also, it is to be understood that the memory 1060 may include further program code for implementing known functionalities of a access node, e.g., known functionalities of an eNB of the LTE technology or of a 5G access node. According to some embodiments, also a computer program may be provided for implementing functionalities of the access node 1000, e.g., in the form of a physical medium storing the program code and/or other data to be stored in the memory 1060 or by making the program code available for download or by streaming.

As can be seen, the concepts as described above may be used for efficiently controlling access to a wireless communication network. Specifically, the concepts may be used to allow efficiently assessing whether system information is still valid and, if the system information is found to be invalid, decide whether the system information should nonetheless be utilized for attempting to access the wireless communication network.

It is to be understood that the examples and embodiments as explained above are merely illustrative and susceptible to various modifications. For example, the illustrated concepts may be applied in connection with various kinds of radio technologies, without limitation to the above-mentioned examples of the LTE RAT or a 5G RAT. Further, the illustrated concepts may be applied in connection with various mechanisms used for conveying system information, without limitation to broadcasting of an AIT or SIB(s). Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

The invention claimed is:

1. A method of controlling access to a wireless communication network, the method comprising:
 a radio device acquiring system information for accessing the wireless communication network, the system information comprising a first set of parameters and a second set of parameters, wherein the first set of parameters is assigned to a first risk level and the second set of parameters is assigned to a second risk level that is lower than the first risk level;
 the radio device receiving first validity information which enables the radio device to determine whether the first set of parameters is up-to-date;
 based on the received first validity information, the radio device determining whether the first set of parameters is up-to-date; and
 as a result of determining that the first set of parameters is up-to-date, the radio device accessing the wireless communication network using the first set of parameters and the second set of parameters, regardless of whether the second set of parameters is up-to-date.

2. The method of claim 1, further comprising:
 the radio device receiving second validity information which enables the radio device to determine whether the second set of parameters is up-to-date;
 the radio device determining whether the second set of parameters is up-to-date based on the second validity information; and
 as a result of determining that the second set of parameters is not up-to-date, the radio device transmitting a request for updated system information.

3. The method of claim 1, wherein
 the first set of parameters comprises a power parameter, and
 the method further comprises
 based on the power parameter, the radio device deriving an initial transmit power to be used for a random access procedure; and
 the radio device transmitting an access message using a transmission power based on the derived initial transmit power.

4. The method of claim 1, wherein
 acquiring the system information comprises receiving an access information table comprising the first set of parameters, the second set of parameters, and an identifier associated with the first set of parameters and the second set of parameters, and
 the method further comprises:
 the radio device receiving the identifier from a network node and;
 based on the received identifier, the radio device retrieving from the access information table the first set of parameters and the second set of parameters.

5. The method of claim 4, wherein
 the radio device receives the first validity information in conjunction with the identifier, and
 the first validity information and the identifier are broadcasted by one or more network nodes.

6. The method of claim 4,
 wherein the identifier corresponds to a signature sequence utilized by the radio device to synchronize with an access node of the wireless communication network.

7. The method of claim 1, further comprising:
 the radio device periodically receiving from a network node validity information which enables the radio device to determine whether a set of parameters associated with the network node is up-to-date;
 the radio device periodically receiving updated system information, wherein
 a frequency of receiving said validity information is higher than a frequency of receiving said updated system information.

8. The method of claim 1,
 wherein the first validity information is based on a hash and/or checksum of the system information.

9. The method of claim 1, comprising:
 wherein the first validity information is based on a sequence number which is adjusted with each update of the system information.

10. The method of claim 1,
 wherein the first risk level is based on a probability of an occurrence of a problem caused by accessing the wireless communication network using the first set of parameters.

11. The method of claim 1,
 wherein the first risk level is based on a severeness level of a problem caused by accessing the wireless communication network using the first set of parameters.

12. A computer program product comprising a non-transitory computer readable medium storing a computer program comprising program code to be executed by at least one processor of a radio device, wherein execution of the program code by the at least one processor causes the radio device to perform the method of claim 1.

13. A method of controlling access to a wireless communication network, the method comprising:
 an access node of the wireless communication network transmitting a message such that the message can be received and used by a radio device that stores a set of access information associated with an index, wherein the message comprises validity information and the index, the set of access information comprises a first set of parameters associated with a first risk level and a second set of parameters associated with a second risk level that is lower than the first risk level, and the validity information enables the radio device to determine whether the first set of parameters associated with the index is up-to-date; and the access node receiving an access request transmitted by the radio device after the radio device determines that the first set of parameters is up-to-date.

14. The method of claim 13,
wherein the validity information is based on a hash and/or checksum of the system information.

15. The method of claim 13,
wherein the validity information is based on a sequence number which is adjusted with each update of the system information.

16. The method of claim 13, further comprising:
the access node transmitting an identifier to the radio device, the identifier enabling the radio device to acquire the system information from an access information table.

17. The method of claim 16,
wherein the access node broadcasts the validity in conjunction with the identifier.

18. The method of claim 16,
wherein the identifier corresponds to a signature sequence utilized by the radio device to synchronize with an access node of the wireless communication network.

19. The method of claim 13, wherein
the access node periodically transmits to the radio device validity information which enables the radio device to determine whether a set of parameters associated with the access node is up-to-date,
the access node periodically transmits updated system information to the radio device, and
a frequency of transmitting validity information is higher than a frequency of transmitting said updated system information.

20. The method of claim 13,
wherein the first risk level is based on a probability of an occurrence of a problem caused by accessing the wireless communication network using the first set of parameters.

21. The method of claim 13,
wherein the first risk level is based on a severeness level of a problem caused by accessing the wireless communication network using the first set of parameters.

22. A computer program product comprising a non-transitory computer readable medium storing a computer program comprising program code to be executed by at least one processor of an access node for a wireless communication network, wherein execution of the program code by the at least one processor causes the access node to perform the method of claim 13.

23. A radio device for a wireless communication network, the radio device comprising:
a memory; and
a processing unit coupled to the memory, wherein the processing unit comprises one or more processors and is configured to cause the radio device to:
acquire system information for accessing the wireless communication network, the system information comprising a first set of parameters and a second set of parameters, wherein the first set of parameters is assigned to a first risk level and the second set of parameters is assigned to a second risk level that is lower than the first risk level,
obtain first validity information which enables the radio device to determine whether the first set of parameters is up-to-date,
based on the received first validity information, determine whether the first set of parameters is up-to-date, and
as a result of determining that the first set of parameters is up-to-date, access the wireless communication network using the first set of parameters and the second set of parameters, regardless of whether the second set of parameters is up-to-date.

24. An access node for a wireless communication network, the access node comprising:
a transmitter;
a receiver; and
a processing unit coupled to the transmitter, wherein the processing unit comprises one or more processors and is configured to cause the access node to:
employ the transmitter to transmit a message such that the message can be received and used by a radio device that stores a set of access information associated with an index, wherein the message comprises validity information and the index, the set of access information comprises a first set of parameters associated with a first risk level and a second set of parameters associated with a second risk level that is lower than the first risk level, and the validity information enables the radio device to determine whether the first set of parameters associated with the index is up-to-date, and
employ the receiver to receive an access request transmitted by the radio device after the radio device determines that the first set of parameters is up-to-date.

25. A system, comprising:
an access node of a wireless communication network; and
at least one radio device in a coverage area of the access node, wherein
the access node is configured to:
transmit a message such that the message can be received and used by said at least one radio device that stores a set of access information associated with an index, wherein the message comprises validity information and the index, the set of access information comprises a first set of parameters associated with a first risk level and a second set of parameters associated with a second risk level that is lower than the first risk level, and the validity information enables said at least one the radio device to determine whether the first set of parameters associated with the index is up-to-date,
receive an access request transmitted by said at least one radio device after said at least one radio device determines that the first set of parameters is up-to-date, and
said at least one radio device is configured to:
receive the message transmitted by the access node,
determine whether the validity information indicates that the first set of parameters associated with the index is up-to-date, and
as a result of determining that the validity information indicates that the first set of parameters associated with the index is up-to-date, transmit the access request to the access node using the first set of parameters associated with the index and the second set of parameters associated with the index.

* * * * *